United States Patent [19]
Hasegawa et al.

[11] Patent Number: 5,289,069
[45] Date of Patent: Feb. 22, 1994

[54] BRUSHLESS MOTOR

[75] Inventors: Makoto Hasegawa, Yonago; Kenji Kubo, Ikoma; Naoto Noguchi, Hirakata; Toshio Imai, Neyagawa, all of Japan

[73] Assignee: Matsushita Electric Industrial Co., Ltd., Osaka, Japan

[21] Appl. No.: 748,937

[22] Filed: Aug. 23, 1991

[30] Foreign Application Priority Data

Aug. 29, 1990 [JP] Japan .................. 2-090859
Aug. 31, 1990 [JP] Japan .................. 2-231898

[51] Int. Cl.⁵ .............................. H02K 21/12
[52] U.S. Cl. ........................ 310/156; 310/45; 310/83; 310/114; 310/179; 310/268
[58] Field of Search ............ 310/268, DIG. 6, 113, 310/42, 261, 263, 83, 45, 179, 156, 254, 266, 114

[56] References Cited

U.S. PATENT DOCUMENTS

| | | | |
|---|---|---|---|
| 3,375,385 | 3/1968 | Hayner | 310/268 |
| 4,185,215 | 1/1922 | Montagu | 310/83 |
| 4,318,017 | 3/1982 | Migeon | 310/83 |
| 4,451,749 | 5/1984 | Kanayama | 310/156 |
| 4,536,672 | 8/1985 | Kanayama | 310/156 |
| 4,804,574 | 2/1989 | Osawa | 310/268 |
| 4,839,551 | 6/1989 | Tomisawa | |
| 4,987,333 | 1/1991 | Noguchi | 310/268 |
| 5,028,827 | 7/1991 | Mosslacher | 310/83 |
| 5,028,829 | 7/1971 | Cap | 310/268 |

FOREIGN PATENT DOCUMENTS

| | | |
|---|---|---|
| 0388965 | 9/1990 | European Pat. Off. . |
| 60-237845 | 11/1985 | Japan . |
| 61-236352 | 10/1986 | Japan . |
| 62-25859 | 2/1987 | Japan . |

Primary Examiner—R. Skudy
Attorney, Agent, or Firm—Stevens, Davis, Miller & Mosher

[57] ABSTRACT

A brushless motor comprises a rotor which is rotatable on an axis of the brushless motor and which include permanent magnets arranged circumferentially thereon, an output member connected to the rotor to rotate with the rotor, and a stator which includes electro-magnetic coils energized in order to rotate the rotor, and has a first space which receives the output member therein and a second space which extends from the first space to the outside of the stator so that an output power of the brushless motor is transmitted from the output member to the outside of the brushless motor through the second space.

15 Claims, 8 Drawing Sheets

FIG. 2
FIG. 3
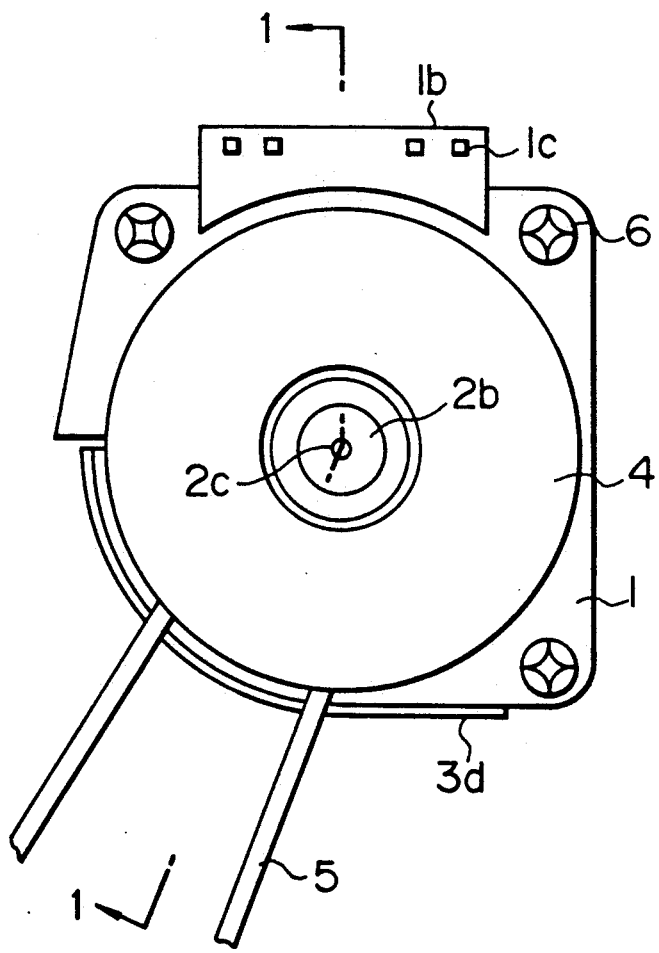
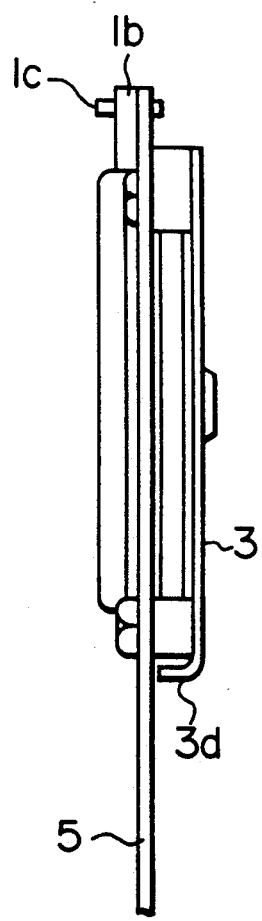

5,289,069

BRUSHLESS MOTOR

BACKGROUND OF THE INVENTION AND RELATED ART STATEMENT

The present invention relates to a brushless motor, particularly relates to a flat brushless motor with a short axial length preferable for a compact electric device.

As shown in FIG. 12, a conventional brushless motor used in the compact tape recorder has a body 101 receiving a stator coil, a rotor including permanent magnets and a sub-rotor. A rotor shaft 102 projects axially outwardly from the body 101, and a pulley 103 is mounted on the rotor shaft 102 at the outside of the body 101 so that an output power of the brushless motor can be transmitted by a belt 104 wound on the pulley 103.

OBJECT AND SUMMARY OF THE INVENTION

An object of the present invention is to provide a brushless motor which has a small axial length although the brushless motor has output means for transmitting an output power of the brushless motor to the outside of the brushless motor.

According to the present invention, a brushless motor comprises, rotor means which is rotatable on an axis of the brushless motor and which include permanent magnets arranged circumferentially thereon, output means connected to the rotor means to rotate with the rotor means, and stator means which include electro-magnetic coils energized in order to rotate the rotor means, and have a first space which receives the output means therein and a second space which extends from the first space to the outside of the stator means so that an output power of the brushless motor is transmitted from the output means to the outside of the brushless motor through the second space.

Since the stator means have the first space which receives the output means therein and the second space which extends from the first space to the outside of the stator means so that the output power of the brushless motor is transmitted form the output means to the outside of the brushless motor through the second space, a distance in the axial direction of the brushless motor between the stator means and the output means is substantially zero, a distance in the axial direction of the brushless motor between the output means and the rotor means is very small, and a distance in the axial direction of the brushless motor between the output means and a magnetically energized field between the stator means and the rotor means is very small. Therefore, a length of the brushless motor in the axial direction of the brushless motor is very small, and a difference in axial position between a force transmitted from the output means to the outside of the brushless motor through the second space and a force generated on the rotor means by the stator means to drive the output means is very small so that a capacity of a bearing for supporting rotatably the rotor means and the output means in relation to the stator and for keeping accurately a space of the magnetically energized field between the stator means and the rotor means may be small.

BRIEF DESCRIPTION OF THE DRAWINGS

FIG. 2 is a front view showing the embodiment of FIG. 1.

FIG. 3 is a side view showing the embodiment of FIG. 1.

DETAILED DESCRIPTION OF PREFERRED EMBODIMENTS

Figure 1:
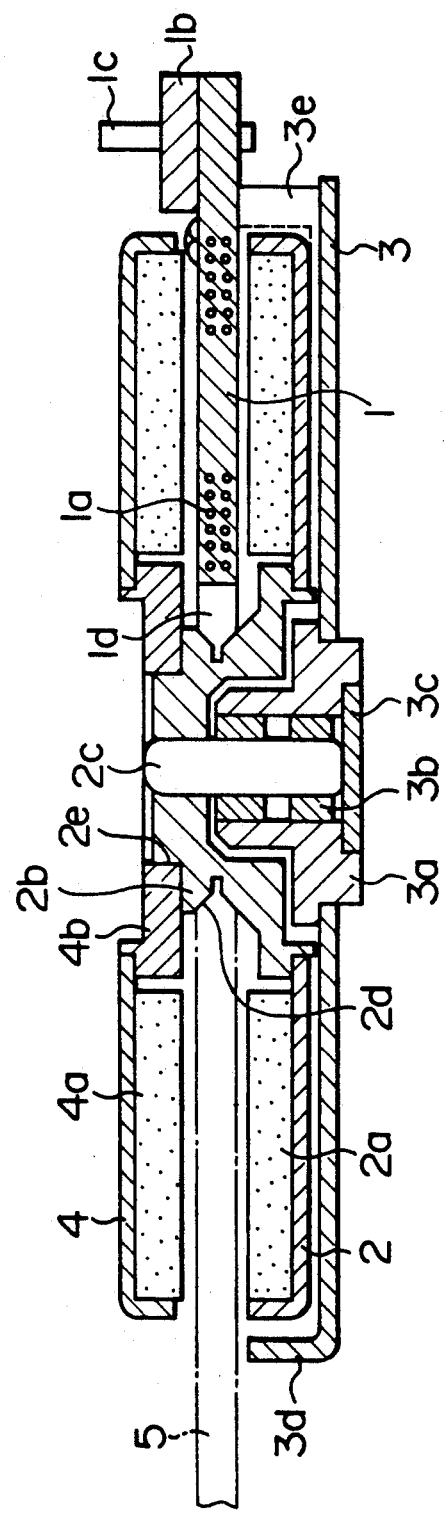
FIG. 1 is a cross-sectional view taken along a line 1—1 of FIG. 2 to show an embodiment of a flat brushless motor according to the present invention.
Figure 4:
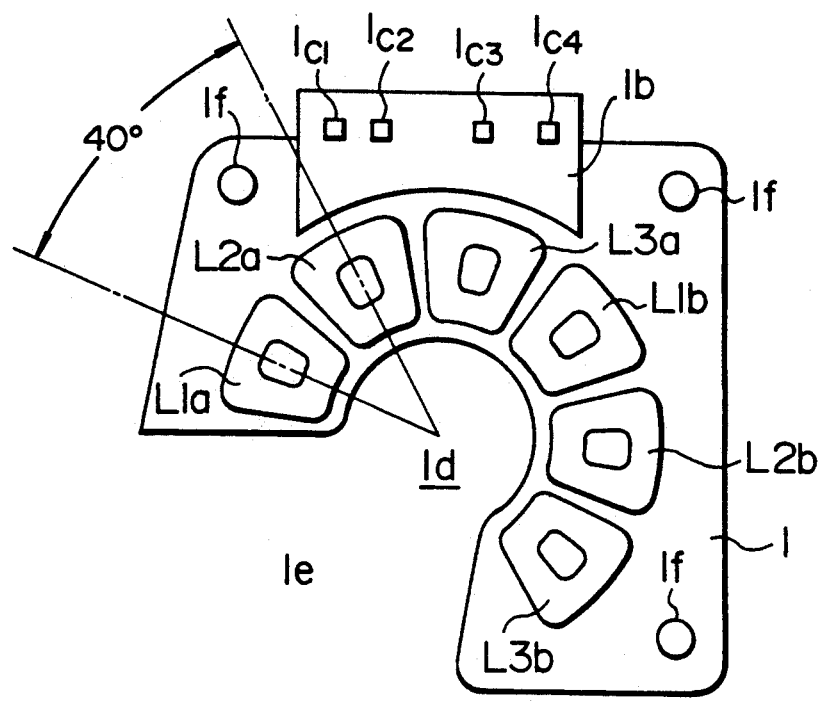
FIG. 4 is a front view showing an embodiment of a stator according to the present invention.

As shown in FIGS. 1 to 7, an embodiment of a flat brushless motor according to the present invention includes a stator 1 containing electro-magnet driving coils 1a. An outer periphery of the stator 1 has a terminal holding member 1b including terminals 1c, and a first space 1d of the stator 1 is formed at a central portion of the stator 1. As shown in FIG. 4, the driving coils 1a (FIG. 6) constituted by individual coils L1a, L1b, L2a, L2b, L3a and L3b (FIG. 4) whose coil turns may be substantially equal to each other to form respective magnetic flux densities identical to each other are arranged on a circular line separately with angular distances of 40 degrees. Alternatively, a total amount of coil turns of L1a and L1b, a total amount of coil turns of individual coils L2a and L2b, and a total amount of coil turns of individual coils L3a and L3b may be equal to each other so that the respective magnetic flux densities of three-phases magnetic energizing are equal to each other. Three-phase driving combinations of individual coils L1a-L1b, L2a-L2b and L3a-L3b are energized in order so that a magnetically energized field by the driving coils 1a rotates along the circular line. A second space 1e of the stator 1 is formed between individual coils L1a and L3b (FIG. 4). Each of the three-phases driving combinations has the same number of the driving coils 1a, that is, two of the driving coils 1a so that driving forces by the three-phases driving combinations of the driving coils 1a are substantially equal to each other. Therefore, a driving force by the driving coils 1a is always constant. In a preferred embodiment, as clearly seen in FIG. 4, the electromagnetic coils adjacent to each other do not overlap each other in the axial direction of the brushless motor.

Figure 5:
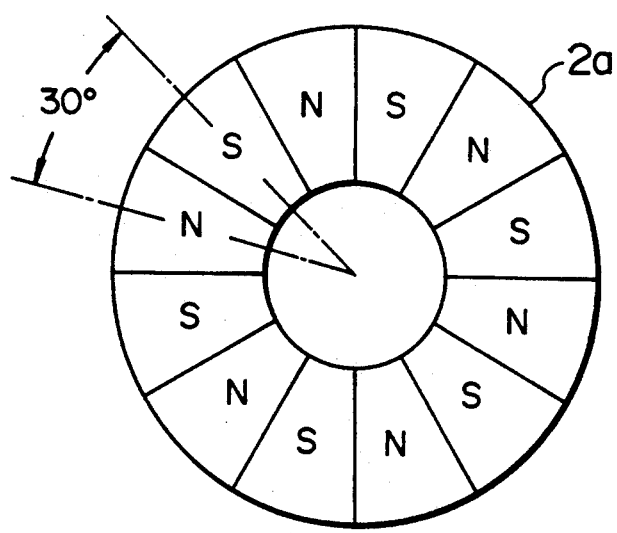
FIG. 5 is a schematic front view showing an arrangement of permanent magnets on a rotor.

A disk-shaped rotor 2 is rotatable on an axis of the brushless motor and has permanent magnets 2a facing to the driving coils 1a of the stator 1 with an axial magnetically energized clearance therebetween. A number of poles of the permanent magnets $2a$ is twelve and the permanent magnets $2a$ are arranged on the rotor 2 with angular distances of 30 degrees, as shown in FIG. 5. A pulley $2b$ is fixed to the rotor 2 and a central axis of the pulley $2b$ is kept on that of the rotor 2. The pulley $2b$ is mounted on a shaft $2c$ so that the pulley $2b$ is rotatably supported through the shaft $2c$ by a bearing $3a$ fixed to a bracket 3. The pulley $2b$ has a V-shaped belt groove $2d$ at an outer periphery thereof, and has a cylindrical projection $2e$.

The bearing $3a$ has a radial bearing $3b$ and a thrust bearing $3c$. The bracket 3 has a magnetic shield plate $3d$ which is made of a magnetically conductive material and extends along an outer periphery of the brushless motor so that an electromagnetic wave generated by the stator 1 is prevented from acting on an electronic device, for example, a tuner circuit or amplifier circuit or a magnetic head. The stator 1 is supported on the bracket 3 through a plurality of support columns $3e$ by screws 6.

A sub-rotor 4 is fixed to the pulley $2b$ through a holder member $4b$ fixed to the projection $2e$ of the pulley $2b$ so that the sub-rotor 4 and the rotor 2 are rotatable on the axis of the brushless motor. The sub-rotor 4 has permanent magnets $4a$ which are the same as the permanent magnets $2a$ and face the driving coils $1a$ of the stator 1 with an axial magnetically energized clearance therebetween so that the stator 1 is arranged between the sub-rotor 4 and the rotor 2. N poles of the rotor 2 face S poles of the sub-rotor 4 through the stator 1, and S poles of the rotor 2 face N poles of the sub-rotor 4 through the stator 1. From the above description and FIGS. 1 and 4, it will be immediately apparent that the N poles of the rotor 2 must necessarily face the S poles of the sub-rotor 4 through the second space $1e$ and similarly that the S poles of the rotor 2 must necessarily face the N poles of the sub-rotor 4 through the second space $1e$. The holder member $4b$ extends radially outwardly from the projection $2e$ of the pulley $2b$ so that a diameter of the first space $1d$ is small although an inner diameter of the sub-rotor 4 is large. The magnetically energized clearance between the permanent magnets $4a$ of the sub-rotor 4 and the driving coils $1a$ of the stator 1 is substantially equal to the magnetically energized clearance between the permanent magnets $2a$ of the rotor 2 and the driving coils $1a$ of the stator 1 so that a magnetic force in an axial direction of the brushless motor between the sub-rotor 4 and the stator 1 is substantially equal to a magnetic force in the axial direction of the brushless motor between the rotor 2 and the stator 1. Therefore, a force in the axial direction of the brushless motor is not applied to the stator 1 and a movement or deformation of the stator 1 in the axial direction of the brushless motor is prevented. If a magnetomotive force of the permanent magnets $4a$ is different from that of the permanent magnets $2a$, the magnetically energized clearance between the sub-rotor 4 and the stator 1 and the magnetically energized clearance between the rotor 2 and the stator 1 is adjusted to make the magnetic force in the axial direction between the sub-rotor 4 and the stator 1 substantially equal to the magnetic force in the axial direction between the rotor 2 and the stator 1. That is, when the magneto-motive force of the permanent magnets $4a$ is smaller than that of the permanent magnets $2a$, the magnetically energized clearance between the sub-rotor 4 and the stator 1 is made smaller than the magnetically energized clearance between the rotor 2 and the stator 1 so that a magnetic flux density by the permanent magnets $2a$ is made substantially equal to a magnetic flux density by the permanent magnets $4a$, and when the magnetomotive force of the permanent magnets $4a$ is larger than that of the permanent magnets $2a$, the magnetically energized clearance between the sub-rotor 4 and the stator 1 is larger than the magnetically energized clearance between the rotor 2 and the stator 1 so that a magnetic flux density by the permanent magnets $2a$ is made substantially equal to a magnetic flux density by the permanent magnets $4a$.

Figure 6:
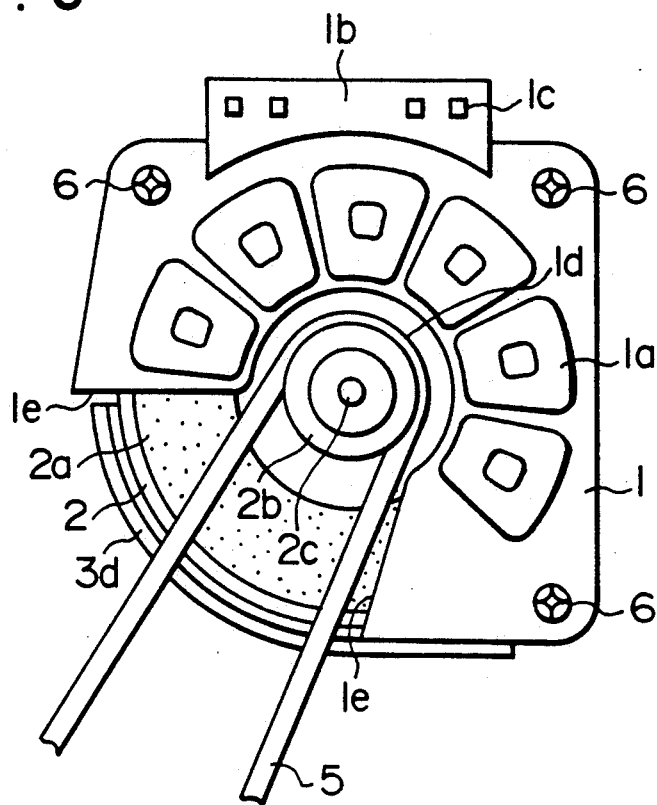
FIG. 6 is a front view showing an arrangement of the stator, the rotor and a pulley.
Figure 7:
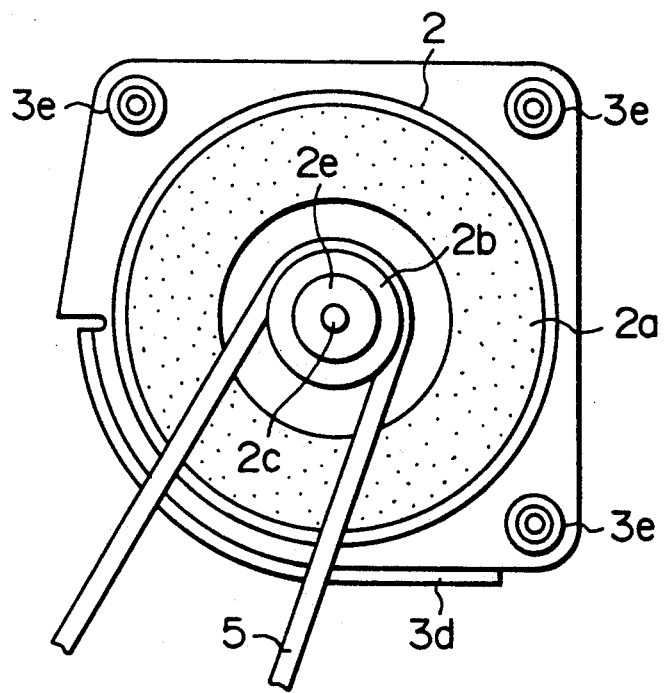
FIG. 7 is a front view showing an arrangement of the rotor and the pulley.
Figure 13:
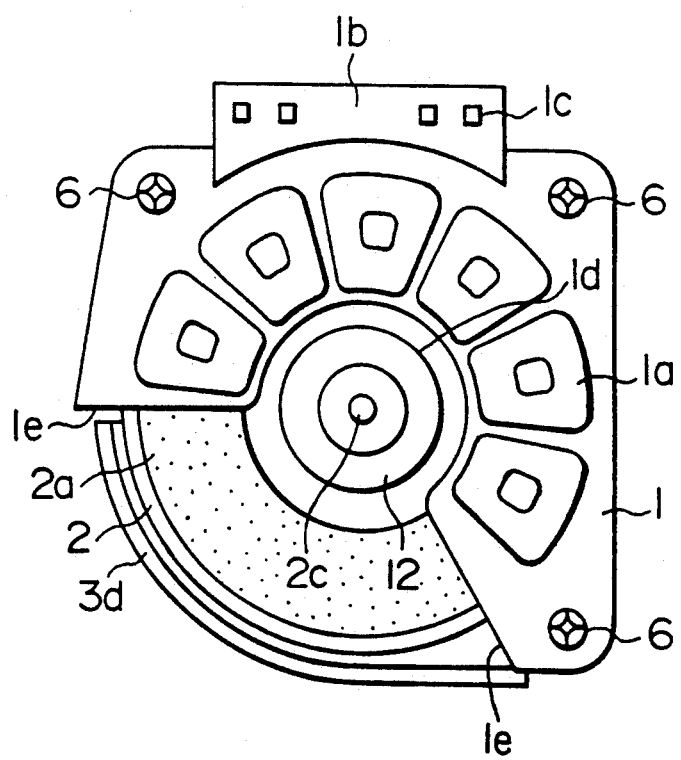
FIG. 13 is a front view showing an arrangement of the stator, the rotor and a gear.

A belt 5 is wound on the belt groove $2d$ of the pulley $2b$ in the first space $1d$ and passes through the second space $1e$ so that an output power of the brushless motor can be taken out to the outside of the brushless motor. A gear 12 (FIG. 13) may be fixed to the rotor 2 instead of the pulley $2b$ and may engage with another gear (not shown) which is rotatable on an axis at the outside of the brushless motor and is arranged in the second space $1e$ so that the output power of the brushless motor can be taken out to the outside of the brushless motor through the second space $1e$, as shown in FIG. 6, although the pulley $2b$ or the gear 12 is received in the stator 1. Since the pulley $2b$ or the gear 12 for transmitting the output power of the brushless motor to the outside of the brushless motor is received in the stator 1, a size of the brushless motor, particularly an axial length of the brushless motor is small, and a moment which is generated by the pulley $2b$ or the gear 12 for transmitting the output power of the brushless motor to the outside of the brushless motor and by the stator 1 for driving the rotor 2 and/or the sub-rotor 4 and which is born by the bearing $3a$ is small.

Figure 8:
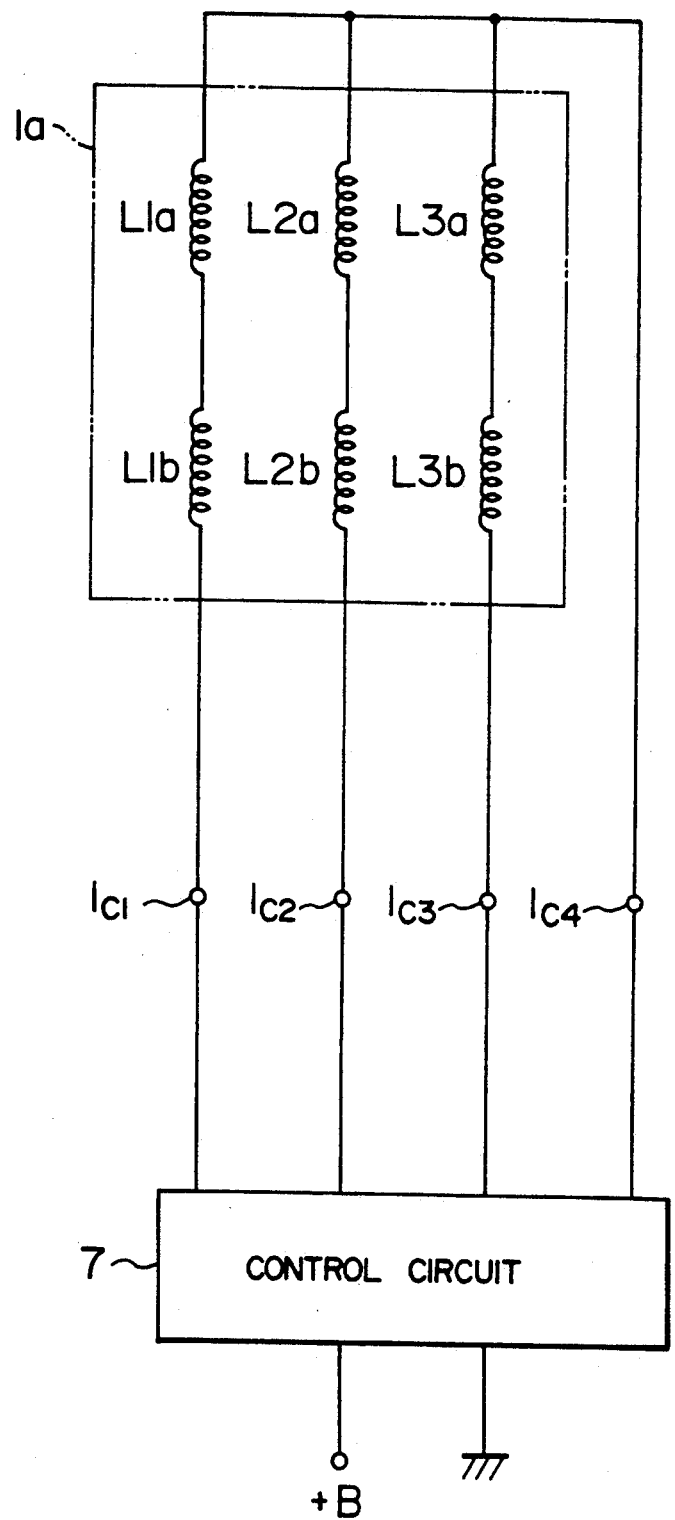
FIG. 8 is a diagram showing a control device for energizing in order electro-magnets of the stator.
Figure 9:
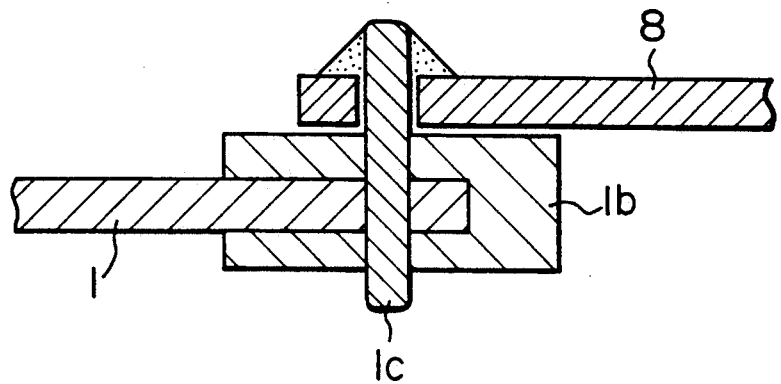
FIG. 9 is a schematic view showing a structure for mounting the stator and terminal members of the stator.
Figure 12:
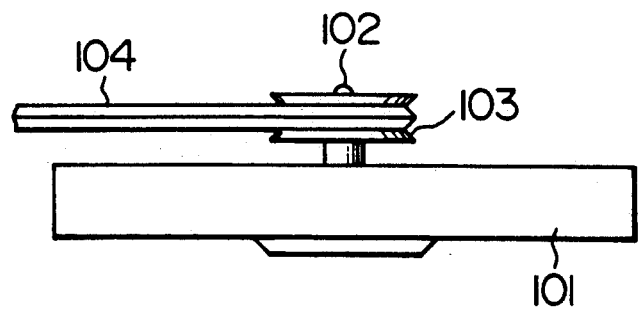
FIG. 12 is a side view showing a conventional brushless motor.

As shown in FIG. 8, the coils $L1a$ and $L1b$ are connected to a terminal $1c1$ in series, the coils $L2a$ and $L2b$ are connected to a terminal $1c2$ in series, the coils $L3a$ and $L3b$ are connected to a terminal $1c3$ in series, and the combinations of the coils $L1a$–$L1b$, $L2a$–$L2b$ and $L3a$–$L3b$ are connected together to a terminal $1c4$ so that the three-phases driving combinations of $L1a$–$L1b$, $L2a$–$L2b$ and $L3a$–$L3b$ are energized in order by a control circuit 7 to rotate the rotor 2 and/or the sub-rotor 4. As shown in FIG. 9, since the terminals $1c$ of the stator 1 project outwardly from the terminal holder member $1b$, the stator 1 can be easily connected to a printed circuit plate 8.

Figure 10:
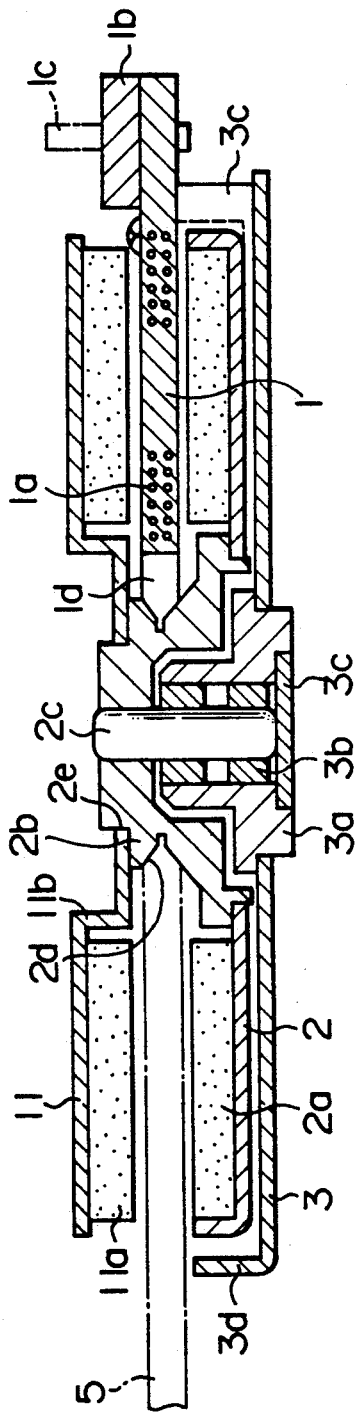
FIG. 10 is a cross-sectional view showing another embodiment of the present invention.

As shown in FIG. 10, a sub-rotor 11 includes permanent magnets $11a$ which are the same as the permanent magnets $2a$ or $4a$ with the twelve magnetic poles, and may be directly fixed to the projection $2e$ of the pulley $2b$ on the rotor 2 without the holder member $4b$ through a central recess $11b$ of the sub-rotor 11. A depth of the recess $11b$ is determined in such a manner that a magnetically energized clearance between the sub-rotor 11 and the stator 1 is substantially equal to the magnetically energized clearance between the rotor 2 and the stator 1. An inner diameter of an opening of the recess $11b$ is equal to that of the holder member $4b$ so that the sub-rotor 4 can be easily exchanged for the sub-rotor 11. N poles of the rotor 2 face to S poles of the sub-rotor 11 through the stator 1, and S poles of the rotor 2 face to N poles of the sub-rotor 11 through the stator 1 so that the sub-rotor 4 and the rotor 2 is rotated in accordance with changes of energizing the coils $1a$ of the stator 1.

Figure 11:
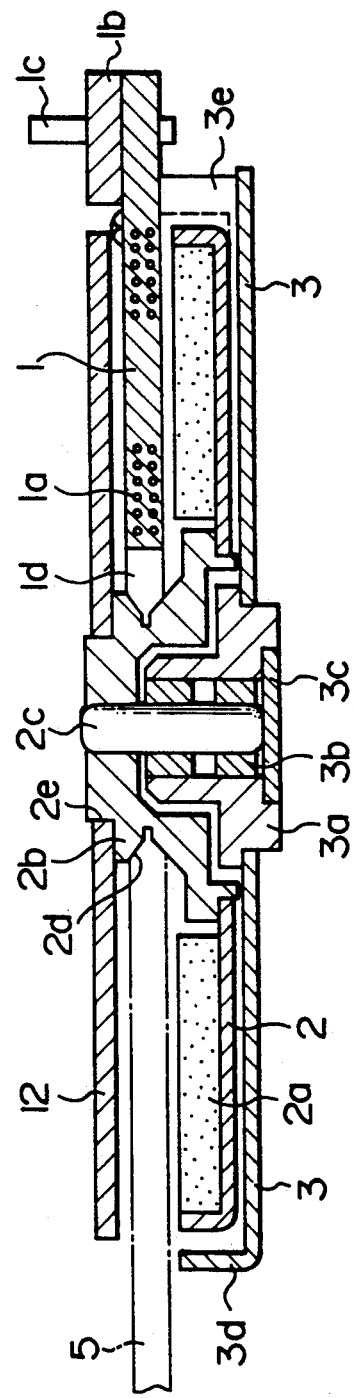
FIG. 11 is a cross-sectional view showing another embodiment of the present invention.

As shown in FIG. 11, the sub-rotor 4 with the permanent magnets $4a$ may be replaced by a flat sub-rotor 12 made of a magnetically conductive material, for example, iron. The sub-rotor 12 is fixed to the projection 2e of the pulley 2b on the rotor 2 without the holder member 4b. An inner diameter of an opening of the sub-rotor 12 is equal to that of the holder member 4b so that the sub-rotor 4 can be easily exchanged for the sub-rotor 12 or each of the other various sub-rotors including a common opening diameter A magnetically energized clearance between the sub-rotor 12 and the stator 1 is substantially equal to the magnetically energized clearance between the permanent magnets 2a of the rotor 2 and the stator 1.

The coils 1a may be made by an etching process or by a plating process, and the sheet shaped coils 1a made on a surface of the stator 1 by an etching process or by a plating process may be securely fixed to the surface of the stator 1 by an electric insulating material covering the sheet-shaped coils 1a.

What is claimed is:

1. A brushless motor comprising:
    rotor means which is rotatable on an axis of the brushless motor and which includes permanent magnets arranged circumferentially thereon,
    output means connected to the rotor means to rotate with the rotor means, and
    stator means which includes electro-magnetic coils energized in order to rotate the rotor means, said stator means having a first space which receives the output means therein and a second space which extends radially from the first space to a region external to the stator means so that an output power of the brushless motor is transmitted from the output means to a region external to the brushless motor through the second space,
    the rotor means comprising sub-rotor means which is rotatable on the axis of the brushless motor, the sub-rotor means being fixed to the output means and having permanent magnets whose N poles face S poles of the rotor means through the second space and whose S poles face N poles of the rotor means through the second space.

2. A brushless motor according to claim 1, wherein the N poles of the permanent magnets of the sub-rotor means face the S poles of the rotor means through the stator means and wherein the S poles of the permanent magnets of the sub-rotor means face the N poles of the rotor means through the stator means.

3. A brushless motor according to claim 1, wherein the sub-rotor means includes a magnetically conductive material.

4. A brushless motor according to claim 1, wherein the second space extends substantially perpendicularly to the axis of the brushless motor.

5. A brushless motor according to claim 1, wherein the output means is a pulley.

6. A brushless motor according to claim 1, wherein the output means is a gear.

7. A brushless motor according to claim 1, wherein the electro-magnetic coils of the stator means are made by an etching process.

8. A brushless motor according to claim 1, wherein the electro-magnetic coils of the stator means are made by a plating process.

9. A brushless motor according to claim 1, wherein a number of coil turns of the electro-magnetic coils energized simultaneously is always constant.

10. A brushless motor according to claim 2, wherein a magnetomotive force of the permanent magnets of the sub-rotor means is substantially equal to that of the rotor means.

11. A brushless motor according to claim 7, wherein the electro-magnetic coils of the stator means are covered by an electric insulating material to fix securely the electro-magnetic coils to the stator means.

12. A brushless motor according to claim 10, wherein an axial magnetically energized clearance between the permanent magnets of the sub-rotor means and the electro-magnetic coils of the stator means is substantially equivalent to an axial magnetically energized clearance between the permanent magnets of the rotor means and the electro-magnetic coils of the stator means.

13. A brushless motor according to claim 3, wherein an axial magnetically energized clearance between the sub-rotor means and the electro-magnetic coils of the stator means is substantially equivalent to an axial magnetically energized clearance between the rotor means and the electro-magnetic coils of the stator means.

14. A brushless motor according to claim 8, wherein the electro-magnetic coils of the stator means are covered by an electric insulating material to fix securely the electro-magnetic coils to the stator means.

15. A brushless motor according to claim 1, wherein the electro-magnetic coils adjacent to each other do not overlap each other in an axial direction of the brushless motor.

* * * * *